July 14, 1942.  B. G. ALDRIDGE  2,289,953
METHOD AND APPARATUS FOR MIXING FLUIDS
Filed Dec. 17, 1938  2 Sheets-Sheet 2
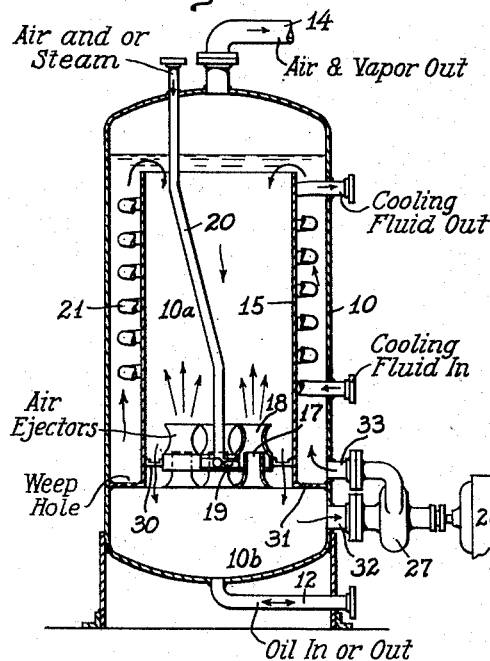
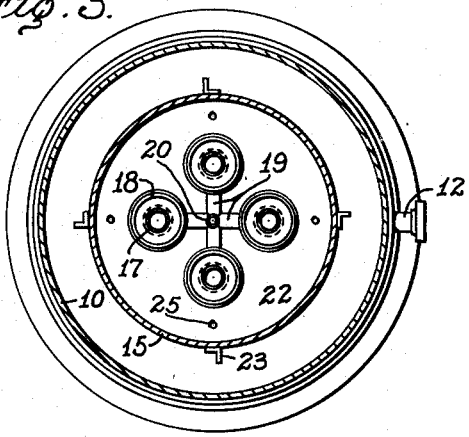
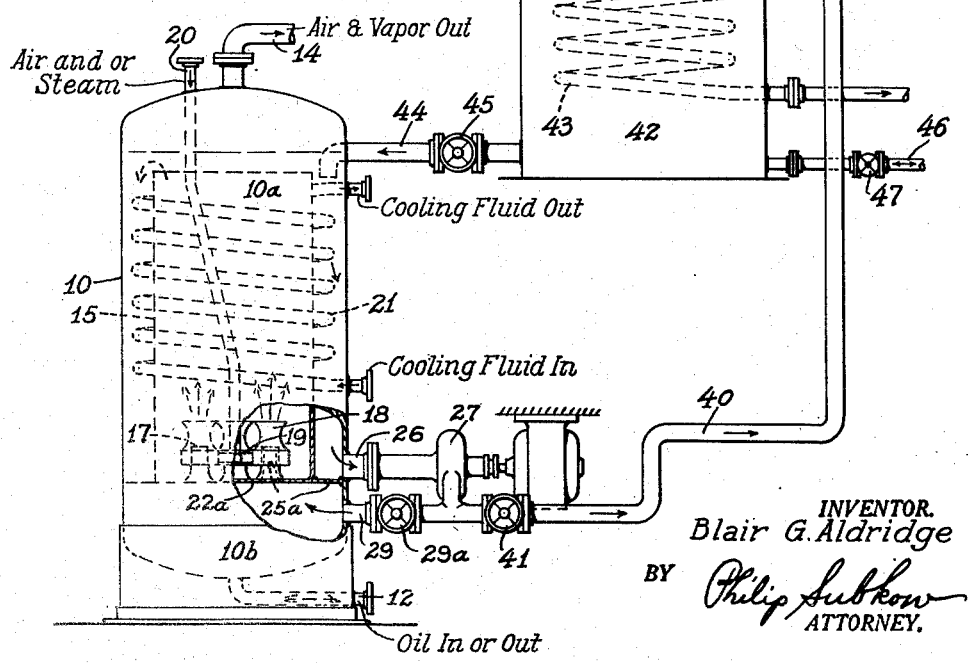
INVENTOR.
Blair G. Aldridge
BY Philip Subkow
ATTORNEY.

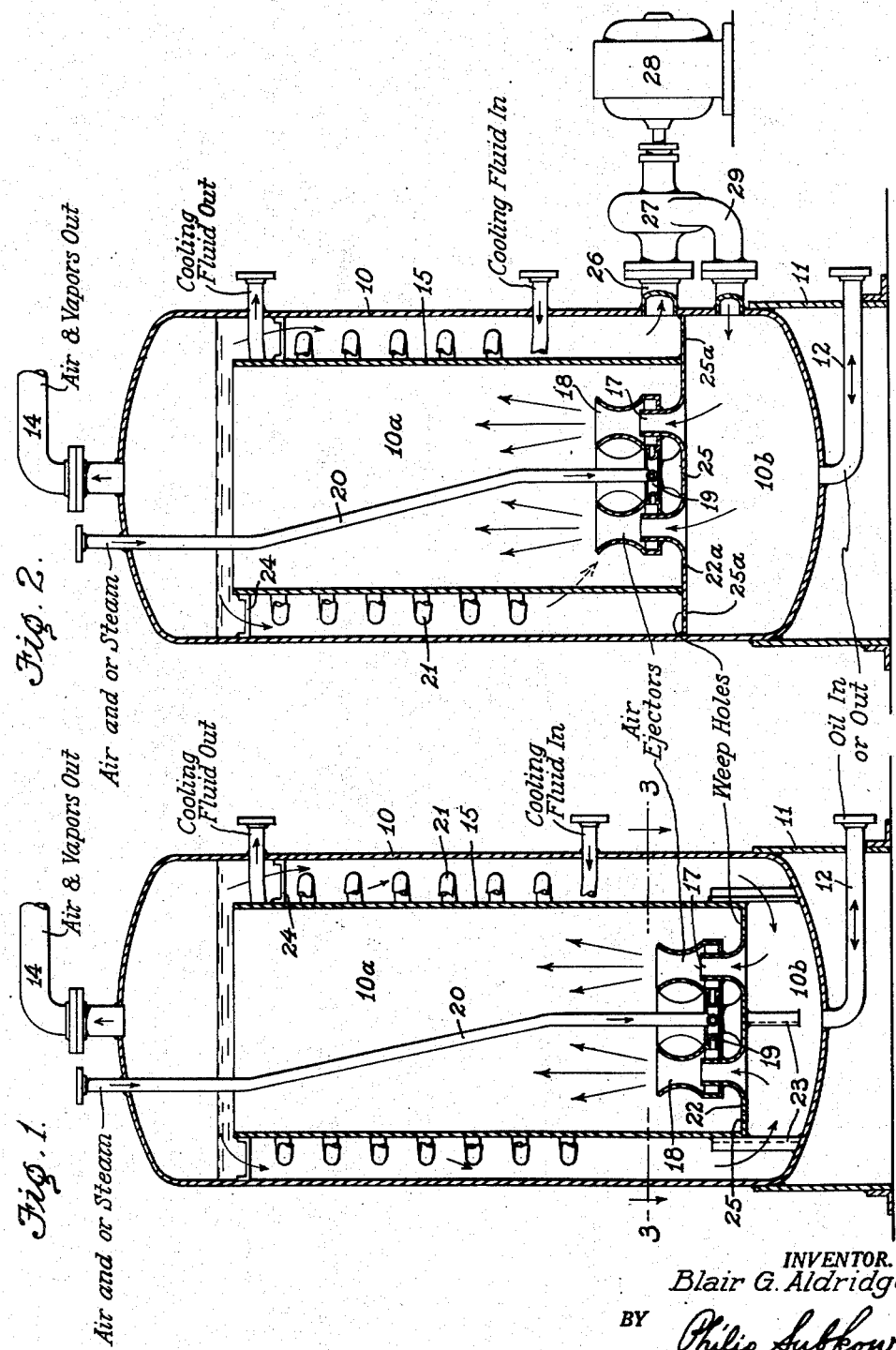

Patented July 14, 1942

2,289,953

UNITED STATES PATENT OFFICE 2,289,953

METHOD AND APPARATUS FOR MIXING FLUIDS

Blair G. Aldridge, Los Angeles, Calif., assignor to Union Oil Company of California, Los Angeles, Calif., a corporation of California Application December 17, 1938, Serial No. 246,411

4 Claims. (Cl. 196—74)

This invention relates to processes and apparatus for treating petroleum oils and in particular the invention relates to the production of oxidized or air-blown asphalt.

It is an object of my invention to provide a simple, efficient, and economical process by which petroleum oils may be converted into asphaltic products of desired penetration, melting point, ductility and solubility in carbon disulfide and carbon tetrachloride and 86° gasoline.

It is a further object of my invention to provide a process and apparatus whereby the various characteristics of penetration, melting point, ductility and solubility of asphalt may be controlled and varied independently and at will.

It is a further object of my invention to control the oxidation of oil to produce air-blown asphalt so as to obtain a uniformly oxidized asphalt.

It is an important object of my invention to control the oxidation of oil so as to partially oxidize the oil by contacting it with oxygen-containing gas, to accomplish substantially complete use of the oxygen under controlled conditions, to remove undesirable gaseous and vaporous products of reaction, to prevent oxidation of vapors in the vapor space of the oxidizing still and to prevent formation of carbonaceous and coke-like materials in the still.

It is a further important object of my invention to reduce the time necessary to air-blow asphalt to the desired grade.

Another important object of my invention is to reduce the distillation during oxidation of desirable oil fractions which impart the desired characteristics to the final product.

Another important object of my invention is to control the temperature of the oxidation reaction by commingling the charge undergoing oxidation with cooler oil.

A further object of my invention is to effect the oxidation reaction in a cyclic and continuous manner with a minimum power consumption.

Other objects of my invention will appear from the included description of preferred embodiments of my process appearing below.

The use of air has been employed for many years and is well known in the art of producing oxidized asphalt. However, in the past, it has been impossible to produce oxidized asphalts of desired melting point, penetration and ductilities which have a high solubility in such solvents as carbon disulfide, carbon tetrachloride and 86° gasoline. In these older methods, the penetration, melting point and ductility are not independently variable. If the melting point is increased, the penetration is decreased and the ductility is also decreased. This is due to the fact that the methods cause some of the asphalt to become over-oxidized and part to be under-oxidized. Also, there is a considerable amount of distillation during the oxidation period. The air passes through the oil in large globules and is not intimately mixed with all of the oil. In such methods, the rate of oxidation must be fairly slow, otherwise the temperature of the oil will rise too high, with the resultant low yield and poor quality of asphalt.

Also, in the manufacture of oxidized asphalt in the conventional spider and shell still, it has been found that the oxygen utilization is very poor and that the spent gases from the still will contain as high as 17 to 19% of oxygen showing only a 2 to 4% reduction in the oxygen content of the air. This high oxygen content in the spent gases allows the vapors in the vapor space of the still and the vapor lines to undergo oxidation. This oxidation may carry on at such a rate that the vapor temperatures will suddenly increase, say from 400° F. to as high as 700° or 800° F. This rapid increase in temperature quite often leads to vapor explosions with a resulting rupture of the still or explosion diaphragms built into the still. Also, when the oxygen content of the waste gases is high and oxidation takes place in the vapor space, it has been found upon inspecting the still after completion of a run that large amounts of carbonaceous materials have been found in the still and the vapor lines.

It has been found, as will appear hereinafter, that by limiting the oxygen content of the waste gases to around 12%, the tendency to oxidize in the vapor space is greatly reduced. When the oxygen content of the spent gases is maintained at around 10%, the oxidation in the vapor space is practically negligible and the still and vapor lines are kept practically free of any carbonaceous deposits.

In Patents Nos. 1,953,345, 1,953,346 and 1,999,018, various methods for air blowing oils to produce oxidized asphalts are described which methods have been largely responsible for correcting some of the foregoing evils with the result that a much better product is produced in considerably less time. In these methods, the oil to be oxidized is circulated from a bulk supply maintained in a cylindrical still or container at an oxidizing temperature to a mixing jet, or other type of mixer known in the art for commingling a liquid and a gas into which a regulated quantity of air or oxygen-containing gas is admitted.

The mixture of air and oil and also vapors is returned to the bulk supply container in which the air and vapors are separated from the partially oxidized charging stock. The latter is continuously recirculated to the mixer until the entire batch of stock has been oxidized to the predetermined grade. By this procedure, a superior asphaltic product is produced since the oxidation is not as severe, with the result that less carbonaceous material is produced and a greater ductility and penetration are obtained at given flash and melting points. In this method of oxidation, a better utilization of air is obtained since the oil is more intimately commingled with the air with the attendant result that the oxidation is complete in considerably less time than that required by the older methods. The present invention relates particularly to improvements in the foregoing process of oxidation.

The use of vertical stills is also known in the art of air-blowing to produce asphalt. In this method of oxidation, a vertical still containing a column of oil is air-blown by introducing the air through an air distributing spider positioned at the bottom of the still. The air thus travels upwardly through the oil in the column oxidizing it as the air passes to the vapor space at the top of the column. By providing a column of oil of sufficient height and by regulating the rate of air introduction, fairly good utilization of oxygen is obtained. In fact, a better oxygen utilization is obtained over the conventional shell and spider still method. However, in this method of operation, it is difficult to obtain an even distribution of the air or an intimate admixture of the oil with the air with the result that even though a better oxygen utilization is obtained, part of the oil will be over-oxidized and part will be under-oxidized. Also, it has been found that upon completion of a run, the spiders are usually coated with carbonaceous and coke-like materials, particularly at the nozzle ends of the spiders. The present invention also relates to improvements in the foregoing process of oxidation.

Briefly stated, my invention resides in providing a still, preferably a vertical still, in which is disposed a cylinder or tube which is positioned axially or concentric to the vertical walls of the still thus providing an annular space between the cylinder and the vertical walls of the still. The upper end of the cylinder is open while at the lower end a plurality of ejectors are mounted on a plate covering the lower end of the cylinder. The oil in the still is free to travel when circulated from the annular space to the bottom of the still, then upwardly through the ejectors into the cylinder from which it overflows back into the annular space. Means are provided for introducing air or other oxygen-containing gas into the ejectors. The air is employed not only for oxidizing the oil but to effect the circulation of the oil in the still by drawing it from the bottom of the still through the ejectors into the cylinder from which it overflows back into the annular space between the cylinder and the vertical walls of the still. The air introduction into the ejectors thus creates a jetting or gas-lifting effect through the cylinder. Cooling means are provided preferably in the annular space to cool the oil or to remove the heat of the oxidizing reaction from the oil before it recirculates to the ejectors where it is further oxidized. I have found that an intimate admixture of the oil and air is obtained in the ejectors. Also, by regulating the height of the column of oil in the cylinder, oxidation continues to take place during the upward travel of the oil and air in the cylinder so that substantially complete oxygen utilization is obtained.

I have also found that the circulation of the oil in the still from the annular space to the bottom of the still and upwardly through the ejectors and cylinder may be accomplished by means of a pump which draws oil from the bottom of the annular space and pumps it through the bottom of the still through the ejectors and upwardly in the cylinder. Simultaneously with the pump circulation, air is passed into the ejectors where it commingles with the oil. The air also exerts a gas lifting effect on the oil and thus aids in the oil circulation. I have found that by circulating the oil through the ejectors by means of a pump, the oil may be circulated through the ejectors at a high velocity which maintains the ejectors free from carbonaceous deposits. Also, the oil may be circulated independently of the air pressure and thus the ratio of the oil to air may be controlled within prescribed limits so that substantially complete utilization of the oxygen in the air may be obtained without necessity for regulating the height of the column of oil in the still.

Instead of circulating the oil from the annular space to the bottom of the still and upwardly through the ejectors and the cylinder, I have found that a more intimate and longer contact of the oil and air is obtained if the oil is circulated countercurrently to the flow of air in the cylinder. Thus, it is a feature of my invention to draw the oil from the bottom of the still and pass it by means of a pump upwardly through the annular space between the cylinder and the vertical walls of the still from which it overflows into the cylinder and passes downwardly in the cylinder back to the bottom of the still. Simultaneously with the circulation of oil, air is passed through the ejectors which force the air upwardly in the cylinder countercurrent to the downward passage of oil in the cylinder.

It is another important feature of my invention to cool the oil undergoing oxidation and thus remove the heat of reaction during the process of oxidation by commingling the oil with a sufficient amount of cooler oil to reduce the temperature of the resulting mixture to the desired point. This important feature of my invention is accomplished by providing a tank containing a quantity of the same oil to be oxidized which tank is connected at its lower end with the top of the still and at its upper end with the bottom of the still. With the apparatus connected in this manner, the oil may be circulated from the bottom of the still to the top of the tank and from the bottom of the tank to the still. By providing the tank at a higher elevation than the still, the oil may be passed by gravity from the bottom of the tank to the still. The circulation of oil from the bottom of the still to the top of the tank is preferably by means of a pump. As shown hereinafter, a portion of the oil withdrawn from the still may be by-passed to the bottom of the still and upwardly through the ejectors while the remainder of the withdrawn oil is circulated to the tank. The circulation of oil to the tank from the still and back to the still is controlled and regulated so that the amount of oil passed to the tank from the still will be equivalent to the amount passed to the still from the tank which is necessary to cool the oil in the still to the desired degree. Upon completion of the oxidation reaction, it is obvious that the charge in the still and the tank will have the same characteristics.

Instead of charging the tank with the oil corresponding to the oil to be oxidized in the still, I may charge the tank with a different type of oil than the asphaltic oil to be oxidized, which oil, when blended with the charge undergoing oxidation, will have the property of modifying the final characteristics of the oxidized charge. This oil may be one which will not oxidize when commingled with the air or it may oxidize only partially. Thus, I may provide the tank with a lubricating oil having a high viscosity index, such as a lubricating oil raffinate produced by extraction with a selective solvent such as liquid sulfur dioxide. Such oils are not readily oxidized but when blended with oxidized asphalts impart air-blown characteristics to the asphalt and thus aid in the production of asphalts having superior air-blown characteristics. Obviously, other oils or materials may be employed in the tank which in addition to controlling the temperature of the oil to be oxidized, vary the melting point, penetration, ductility and flash point of the asphalt.

Various other objects, features and advantages of my invention will become apparent to those skilled in the art from the following description of my invention as taken from the drawings in which:

Fig. 1 represents a vertical sectional view with parts in elevation of one modification of my invention;

Fig. 2 represents a vertical sectional view with parts in elevation of another modification of my invention;

Fig. 3 is a section taken along lines 3—3 of Fig. 1;

Fig. 4 represents a vertical sectional view with parts in elevation of another modification of my invention; and Fig. 5 is a full view of the apparatus with parts broken away for carrying out another modification of my invention.

In the various modifications shown in the drawings, 10 is a vertical cylindrical still for containing the bulk supply of oil to be treated and which is supported on a frame work 11. Line 12 located at the bottom of the still serves to introduce the oil to be treated into the still. The line also serves to withdraw the oxidized charge from the still. Line 14 has a vapor line for discharging spent air and vapors from the still. This line may lead to a fractional condenser (not shown) where the heavier oxidized oils may be recovered and returned to the still. A vertical cylinder 15 is positioned axially in the still 10. A plurality of regularly spaced ejectors are provided in the interior of the lower part of the vertical cylinder 15. Each ejector is composed of an open-ended nipple 17 which projects into a nozzle 18. The lower end of the nozzle is preferably welded to the nipple 17. The ejectors are connected to each other by short pipes 19 which at their junction communicate with line 20 employed for the purpose of introducing air or other oxygen-containing gas into the still. Thus when air is introduced through line 20, it passes to the junction of pipes 19 where it divides and passes through pipes 19 into nozzles 18 and then into the cylinder 15. Coil 21 is disposed in the annular space between cylinder 15 and still 10 and serves to circulate cooling or heating fluids for controlling the temperature of the oil in the still.

According to the unit disclosed in Fig. 1 of the drawings, the ejectors are mounted on a plate 22 which is attached to and encloses the lower end of the cylinder 15. The cylinder together with the ejector and air-line 20 is supported by brackets 23 attached to the bottom of the still. The cylinder is supported at its upper end by brackets 24 provided in the annular space between the cylinder and the still. The space between the cylinder and the still at the lower end of the still is open so that oil may be circulated from the annular space between the cylinder and still to the bottom of the still and up through the ejectors. Weep holes 25 are provided in plate 22 for the purpose of preventing a pocket of oil from forming between the plates and the upper end of the ejectors.

According to the unit disclosed in Fig. 2 of the drawings, the ejectors are also attached to a plate 22a as in Fig. 1 except, however, the plate extends to the sides of the still and forms a partition dividing the still into an upper section 10a and a lower section 10b. Weep holes 25a are also provided in the portion of the plate extending from the lower end of the cylinder to the wall of the still. Communication between the annular space between the cylinder and the upper section of the still with the lower section is had through line 26 which is connected to pump 27 driven by motor 28 and line 29. Thus, in this modification, circulation of oil is provided by means of pump 27 which draws the oil from the annular space between the cylinder and the still, pumps it into the lower section 10b of the still from which it is drawn upwardly into the cylinder to the top of the cylinder where it overflows into the annular space.

According to the unit disclosed in Fig. 4 of the drawings, the ejectors are supported by means of brackets 30 which are attached to the ejectors and to the inner wall of the cylinder 15. Thus, in this case, the oil overflowing into the cylinder may flow freely to the bottom of the still. However, the annular plate 31 which is attached to the bottom of the cylinder and to the wall of the still prevents direct communication between the annular space between the cylinder and the still and the bottom of the still. Communication between the bottom of the still and the aforementioned annular space is provided through line 32 which is connected to pump 27 driven by motor 28 and line 33. Thus, in this modification, circulation of oil is provided by means of pump 27 which draws the oil from the bottom of the still, pumps it upwardly into and through the annular space between the cylinder and the still where it overflows back into the cylinder to the bottom of the still.

The operation according to the disclosure of Fig. 1 is as follows: The hydrocarbon oil to be oxidized, such as asphaltic residuum obtained by distilling off the lighter oils, such as kerosene and perhaps gas oils from an asphaltic crude oil, is introduced into the the still 10 via line 12 until the level of the oil is preferably above the upper end of the cylinder 15. Preferably, the oil is preheated to an oxidizing reaction temperature, say 350–475° F. before being admitted into the still. If desired, however, steam or other heating fluid may be circulated through the coil 21 to heat the contents in the still to the required oxidation reaction temperature. During the heating period, the oil is preferably circulated by means of air introduced through line 20 into the ejectors which draws the oil from the bottom of the still through the nipples 17 and nozzles 18 and forces the oil to the top of the still where it overflows back to the annular space and returns to the bottom of the still. This circulation aids in the uniform heating of the charge of oil and is continued until the charge has been brought to the incipent oxidation temperature.

When the desired reaction temperature is reached, the introduction of air is continued at a proper rate, or in the case where the oil was previously preheated before being introduced into the still, the air introduction is started via line 20 and ejectors 18 which causes the oil to circulate as aforementioned. Since the oxidation reaction is an exothermic reaction, the temperature of the oil is gradually increased. When a temperature of say 450–475° F. is reached, cooling fluid, such as oil or water, is circulated through the coil 21 to maintain the temperature of at least the oil in the annular space at about 450–475° F. Thus, the oil being drawn into the ejectors and commingled with air will be at a temperature of about 450–475° F.

The rate of air introduction into the nozzles 18 will depend principally upon the height of the column of oil in the still above the ejectors. Preferably, the air rate and its pressure is controlled so that substantially complete utilization of the oxygen in the air is obtained and at the same time circulation of the oil is produced by the gas-lifting effect of the air. Also, the still should be provided with a column of oil above the ejectors equal to about 20–30 feet. With this column of oil, substantially complete utilization of oxygen is obtained before the air reaches the vapor space of the still with the resulting advantage that high vapor temperatures in the vapor space of the still are entirely prevented. Substantially complete oxygen utilization may be determined by a test on the unused air, a value of about 1–5% of oxygen in the unused air indicating that the process is being carried out in a satisfactory and safe manner. It will be understood, however, that the above is merely a preferred method for carrying out the process and the invention is not to be considered as being limited to the provision of a column of oil of a definite height nor to the complete or substantially complete utilization of oxygen in the air during the process of oxidation.

The circulation of the oil in the still, as aforesaid, is continued until the charge of oil has been brought to the desired melting point and penetration whereupon the introduction of air is discontinued and steam is circulated through line 20. At the same time a heating fluid may be circulated through the coil 21 to raise the temperature of the charge to about 500° F. or the steam introduced through line 20 may be sufficient to raise the temperature to about 500° F. The introduction of steam through the ejectors circulates the charge in the same manner as the air circulated the charge during oxidation. The steam blowing of the charge permits light oils to vaporize from the oxidized charge and is continued until the charge is brought to proper specification with regard to melting point, penetration and flash point. When the charge has been brought to proper grade, it is withdrawn via line 12.

As indicated previously, the vapors and gases separating from the charge at the top of the still are withdrawn via line 14 and may be passed to suitable fractionating and condensing apparatus for the recovery of oils. During the oxidation period, the heavier oil fractions thus recovered which are adapted to be oxidized into asphaltic fractions may be returned to the still for oxidation to asphalt.

The operation according to the modification described in connection with Fig. 2 is similar to that of Fig. 1 with the exception that the circulation of the charge from the annular space between the cylinder and the still to the bottom of section 10b, through the ejectors into the cylinder and back to the annular space is effected mainly by means of a pump 27, although the air if introduced at a sufficient pressure through the ejectors may aid materially in the circulation of the charge. With the circulation of the oil by means of a pump in the manner disclosed, the oil may be circulated at a much more rapid rate with respect to the air being employed than may be accomplished by the use of air alone. This has the advantage that the air rate may be controlled so that a more complete utilization of the oxygen in the air may be obtained and this may be accomplished irrespective of the height of the column of oil above the ejectors. Also, the circulation of the oil through the ejectors at a high velocity maintains the upper edge of the nozzles of the ejectors substantially free from asphalt particles.

In operating an oxidizing process to produce air blown asphalt in this unit, the oil to be oxidized, for example, a residuum of asphaltic crude oil which is preheated to about 350° F. is introduced into the still via the line 12. As soon as the required amount of oil is in the still at a point above the cylinder, the oil introduction is discontinued, pump 27 is started to circulate the oil at about 3,000–15,000 gallons per minute. At the same time, air is introduced via line 20 and ejectors 18 at a rate of about 300 cubic feet per minute. The air introduction and oil circulation are controlled so that the oil circulation with respect to the air is at a rate of about 10–50 gallons per minute per cubic foot of air per minute. I have found that if this oil-air ratio is maintained during the oxidation period, that approximately 30% to 80% or more of the oxygen in the air is consumed by its admixture with the oil with an average of about 60% to 70% when the oil is circulated at a ratio of 30 gallons per cubic foot of air. In other words, with a circulation ratio of approximately 10 gallons of oil per minute to one cubic foot of air per minute, the oxygen content of the spent gases will be in the neighborhood of about 15% while at an oil circulation ratio of about 45 gallons per cubic foot of air per minute, the oxygen content of the spent gases will fall to as low a figure as 3% or 5% and even as low as 1% of oxygen. Heretofore, with lower circulation ratios of four or five gallons per cubic foot of air, it has been impossible to utilize more than about 20% of the oxygen in the air. This increased efficiency of air utilization results in a marked decrease in the amount of carbonaceous or coke-like materials in the final product.

Also, the increased circulation rate enables the oxidation to be effected at a lower temperature with the result that the air blown characteristics of the final product will be materially improved, that is, the asphalt will have a higher melting point for a given penetration and also a higher ductility.

As a specific example of the aforementioned process, an asphalt residuum obtained from an Orcutt crude oil and having an A. P. I. gravity of about 10.5°, a flash point of 420° F. (Pensky-Martens closed cup) and a viscosity of about 145 seconds Saybolt Furol at 210° F. was preheated to about 350° F. and charged to the still. When the charge of about 200 barrels was in the still, the pump was started and the oil circulated at a rate of about 11,000 gallons per minute. Air was then introduced into the charge at a rate of 120 cubic feet per minute for about half an hour and this was gradually increased so that the air rate by the end of the next half hour was about 200 cubic feet per minute and at the end of the subsequent half hour was about 300 cubic feet per minute. The latter was maintained for about 10 hours, or in other words, until a penetration and melting point on the charge was obtained which experience has shown would subsequently enable the charge to produce asphalt of approximately the desired specification. During the air blowing, the temperature of the charge increased to tabout 410° F. which was maintained for the first two hours. It was then increased to about 430° F. during the next hour of air blowing at the end of which the temperature was increased to about 450–460° F. where it was maintained for the balance of the oxidation period. The aforementioned temperatures were maintained and controlled by circulating cooling oil through the cooling coil provided in the still to remove the heat of reaction.

When the charge was brought to near the desired melting point and penetration, the air rate was reduced to about 165 cubic feet per minute and maintained there for about two hours. The air supply was then discontinued and the oxidized charge was steam blown at about 500° F. by the introduction of steam through line 20. During the steam blowing period, the charge was continuously circulated by pump 27 as during the air blowing period until the charge showed a penetration of about 13 (200 gr. per 60 sec.) at 32° F., about 10 (100 gr. per 5 sec.) at 115° F., a melting point (Ball and Ring) of 219° F., a flash point (Pensky-Martens closed cup) of 445° F., a ductility of 2.2 cm. at 77° F., and solubilities of 99.1% in carbon disulfide and carbon tetrachloride and of 75.7% in 86° gasoline.

The process of oxidation according to the modification disclosed in Fig. 4 is similar to those previously described except that the oil is circulated countercurrently to the air. Thus, with the oil in the still at the proper level, i. e., above the cylinder 15, the air is circulated through line 20 and nozzles 18 and the oil is circulated by pump 27 from the bottom of the still, through the annular passage between the cylinder and the still and then overflows into the cylinder countercurrently to the flow of air, the oil passing to the bottom of the still while the gases and vapors pass upwardly to the top of the still from which they are removed via line 14. The nozzle 18 in this modification merely serves as a jet for distributing the air through the oil and for forcing it in an upward direction. However, depending upon the air pressure, a certain amount of the oil may be ejected upwardly from the bottom of the still through the nipple 17 and nozzle 18. Thus, in the operation of the oxidation process with the oil passing countercurrently to the air, opportunity is provided for a longer and more intimate contact of the oil with the air.

In Fig. 5, I have shown a schematic flow sheet for carrying out another modification of my invention. In the figure, still 10 is similar to that shown and described in connection with Fig. 2, although any of the other stills disclosed herein or other oxidizing stills heretofore employed, may be substituted for it in this method of operation. The still 10 is connected by by-pass line 40 controlled by valve 41 with a tank 42 which is provided with a cooling or heating coil 43. Tank 42 is connected at its lower end with the upper end of the still 10 by means of a line 44 controlled by valve 45. Line 46 controlled by valve 47 serves to introduce into or withdraw material from tank 42.

In operation, still 10 and tank 42 are filled to the desired level with oil to be oxidized. Valves 41 and 45 are closed while valve 29a in line 29 is opened. The oil in still 10 is then oxidized in the manner described in connection with Fig. 2 until the desired reaction temperature is reached. Thereupon valve 41 is opened to permit a portion of the oil to be by-passed into tank 42 while the remainder of the oil is returned to the bottom of the still via line 29. Simultaneously therewith, valve 45 is also opened to allow an amount of cooler oil to pass into still 10. The amount of oil thus returned to the still 10 should be equivalent to the amount withdrawn from the still and passed into the tank 42. The amount of oil introduced into the still from tank 42 is regulated so the temperature of the charge undergoing oxidation in the still 10 will be controlled at or below the maximum temperature, for example, 475° F., when producing oxidized asphalt.

Thus, in operating an oxidation process, according to the above procedure, the temperature of the charge is controlled by the continuous regulated addition of cooled oil to the charge undergoing oxidation while continuously withdrawing material from the zone of reaction. It is obvious that as the circulation of the charge from the still 10 to tank 42 and back to the still is continued, the temperature of the charge in the tank 42 will gradually increase due to the addition of hotter material to the tank. This is particularly true during the last stages of oxidation. Therefore, in order to maintain the temperature of the material undergoing oxidation in still 10 at a proper level, it may be necessary to circulate more of the material in tank 42 to the still 10 as the contents in the tank approach the temperature maintained in the still. However, I have provided a cooling coil 43 in tank 42 through which a cooling fluid, such as oil or water, may be circulated to maintain the contents in the tank at a proper temperature. Thus, with the contents in the tank 42 maintained at a temperature somewhat below the temperature in the still, it is possible to continuously maintain the circulation to and from the tank at a definite rate until the completion of the oxidation reaction. I have also shown a coil 21 in still 10 which may be used in lieu of or in addition to the cooling coil 43 in tank 42. Thus, instead of cooling the oil in tank 42, the charge in the still may be maintained at a controlled temperature by circulating cooling fluid through the coil 21 or part of the cooling may be accomplished in the still and part in the tank. Cooling coils 21 and/or 43 may be operated as heating coils if necessary to control the temperature in 10 and 42 at proper levels.

The rate of circulation in the still 10 itself, however, that is, the circulation from the annular passage between the cylinder and the still to the bottom of the still, up through the ejectors into the cylinder and back to the annular passage should be controlled in the manner described in connection with the process of oxidation in Fig. 2, that is, the oil-air ratio passing through the ejectors is such that substantially complete utilization of the oxygen in the air is obtained.

Upon completion of the oxidation reaction, it is thus seen that the contents in the still and the tank will have substantially the same degree of oxidation. These charges may be brought to the desired specification by steam blowing, as described previously. During the steaming operation, the circulation of the charge from the tank to the still may be carried out in the same manner as during the oxidation operation.

The above description of my invention is not to be considered as limiting but only as illustrative of the invention since many changes and modifications thereof will be apparent to those skilled in the art within the scope of the following claims.

I claim:

1. An apparatus for oxidizing oil which comprises a vertical chamber, a vertical cylinder in said chamber substantially concentric with the vertical walls of said chamber and forming an annular passage between said cylinder and the vertical walls of said chamber, said annular passage communicating with the top of said chamber, a plurality of ejectors positioned at the lower end of said cylinder and pumping means for circulating oil from said annular passage to the bottom of said chamber and upwardly through said ejectors to the top of the chamber and to said annular passage and means for introducing an oxygen-containing gas into said ejectors to aid in the circulation of said oil and to oxidize said oil.

2. An apparatus for oxidizing oil which comprises a vertical chamber, a vertical cylinder in said chamber substantially concentric with the vertical walls of said chamber and forming an annular passage between said cylinder and vertical walls of said chamber, said annular passage communicating with the top of said chamber, a plurality of ejectors positioned at the lower end of said cylinder and pumping means for circulating oil from the bottom of said chamber upwardly through said annular passage to the top of the said chamber and downwardly to the bottom of said chamber and means for introducing an oxygen-containing gas into said ejectors.

3. A method for oxidizing oil which comprises providing a body of oil in a vertical chamber provided with a vertical cylinder to form an annular passage between said cylinder and the vertical walls of said chamber, said cylinder communicating with said chamber at its extreme upper portion, the level of said body of oil in said chamber being above the upper extremity of said cylinder, ejecting oil from the bottom of said chamber upwardly through said cylinder to the top of said chamber and downwardly through said annular passage to the bottom of said chamber, introducing an oxygen-containing gas into the oil passing upwardly through said cylinder to oxidize said oil, separating gases and vapors from the oil at the top of said chamber and cooling said oil in said annular passage.

4. A method for oxidizing oil which comprises providing a body of oil in a vertical chamber provided with a vertical concentrically disposed cylinder to form an annular passage between said cylinder and the vertical walls of said chamber, circulating oil from the bottom of said chamber upwardly through said annular passage to the top of said chamber and downwardly in said cylinder to the bottom of said chamber and introducing an oxygen-containing gas into the bottom of said cylinder to pass upwardly in said cylinder countercurrent to the downward passage of oil in said cylinder and oxidizing said oil with said oxygen-containing gas in said cylinder.

BLAIR G. ALDRIDGE.